United States Patent
Kajio et al.

(10) Patent No.: US 10,652,160 B2
(45) Date of Patent: May 12, 2020

(54) ON-VEHICLE SYSTEM, GATEWAY, RELAY, NON-TRANSITORY COMPUTER-READABLE MEDIUM STORING PROGRAM, INFORMATION PROCESSING METHOD, INFORMATION PROCESSING SYSTEM, AND VEHICLE

(71) Applicants: TOYOTA JIDOSHA KABUSHIKI KAISHA, Toyota-shi, Aichi-ken (JP); National University Corporation Nagoya University, Nagoya-shi, Aichi-ken (JP)

(72) Inventors: Kazuhiro Kajio, Okazaki (JP); Hideyuki Iwakiri, Tajimi (JP); Yutaka Matsubara, Nagoya (JP); Hiroaki Takada, Nagoya (JP); Shinya Honda, Nagoya (JP)

(73) Assignees: TOYOTA JIDOSHA KABUSHIKI KAISHA, Toyota-shi (JP); National University Corporation Nagoya University, Nagoya-shi (JP)

( * ) Notice: Subject to any disclaimer, the term of this patent is extended or adjusted under 35 U.S.C. 154(b) by 0 days.

(21) Appl. No.: 16/232,995

(22) Filed: Dec. 26, 2018

(65) Prior Publication Data
US 2019/0207862 A1 Jul. 4, 2019

(30) Foreign Application Priority Data
Dec. 28, 2017 (JP) .................................. 2017-253263

(51) Int. Cl.
*H04L 7/00* (2006.01)
*H04L 12/841* (2013.01)
(Continued)

(52) U.S. Cl.
CPC .......... *H04L 47/283* (2013.01); *H04L 7/0008* (2013.01); *H04L 43/0858* (2013.01); *H04L 67/02* (2013.01); *H04L 67/12* (2013.01)

(58) Field of Classification Search
CPC . H04L 47/283; H04L 7/0008; H04L 43/0858; H04L 67/02
See application file for complete search history.

(56) References Cited

U.S. PATENT DOCUMENTS

2017/0352198 A1* 12/2017 Hasegawa .............. G07C 5/006
2018/0309655 A1* 10/2018 Joseph .................. H04J 3/0667

FOREIGN PATENT DOCUMENTS

| JP | 2002-330148 A | 11/2002 |
| JP | 2014-147105 A | 8/2014 |
| WO | 2009/132456 A1 | 11/2009 |

* cited by examiner

*Primary Examiner* — Jaison Joseph
(74) *Attorney, Agent, or Firm* — Hunton Andrews Kurth LLP

(57) ABSTRACT

In an on-vehicle system, on-vehicle device and gateway are connected via a first network, and the gateway and relay are connected via a second network. The relay performs open-close control of a gate, using a TAS standard of Ethernet TSN. The gateway receives first and second packets including given data, generates a third packet including the first and second packets, and sends the third packets at the transmission timing that is a timing the gate is placed in from closed state to open state to the relay. The relay receives the third packet from the gateway. The relay switches timing to transfer data, for each type of data, and transfer the third packet to the other relay, during a period in which the gate for the type of data is in an open state.

9 Claims, 4 Drawing Sheets

(51) Int. Cl.
*H04L 29/08* (2006.01)
*H04L 12/26* (2006.01)

US 10,652,160 B2

ON-VEHICLE SYSTEM, GATEWAY, RELAY, NON-TRANSITORY COMPUTER-READABLE MEDIUM STORING PROGRAM, INFORMATION PROCESSING METHOD, INFORMATION PROCESSING SYSTEM, AND VEHICLE

INCORPORATION BY REFERENCE

The disclosure of Japanese Patent Application No. 2017-253263 filed on Dec. 28, 2017 including the specification, drawings and abstract is incorporated herein by reference in its entirety.

BACKGROUND

1. Technical Field

The disclosure relates to an on-vehicle system, gateway, relay, a non-transitory computer-readable medium storing program, information processing method, information processing system, and vehicle.

2. Description of Related Art

In the field of network systems, such as an on-vehicle system, a set of standards called Ethernet Time-Sensitive Networking (TSN) for achieving reduction of delay in transfer of packets, for example, is known. According to IEEE 802.1Qbv TAS (Time Aware Shaper) standard included in the Ethernet TSN standards, data to be transferred is allocated to one of two or more types of classes, and is transferred in cycles corresponding to the class to which the data is allocated.

SUMMARY

The case where a gateway collects two or more pieces of data received from a network using Controller Area Network (CAN), etc., into one frame, and transfers the frame to a network using Ethernet (registered trademark), etc. is studied. In this case, a transfer waiting time may arise in a relay compliant with the Ethernet TSN standards, from the time when the relay receives the above one frame, to the time when the frame is transferred in cycles corresponding to the class to which the one frame is allocated. As a result, delay in communications may be relatively increased.

This disclosure provides a technology that leads to reduction of the delay in communications.

An on-vehicle system according to a first aspect of the disclosure has an on-vehicle device; a gateway that is connected to the on-vehicle device via a first network; and a relay that is connected to the gateway via a second network. The relay is configured to perform open-close control of a gate, using a Time Aware Shaper standard of Ethernet Time-Sensitive Networking. The gateway includes a first synchronizer configured to synchronize timing in which the gateway sends given data to the relay, with transmission timing that is timing in which the gate is switched from a closed state to an open state, a first receiver configured to receive a first packet and a second packet each including the given data, from the on-vehicle device, a generator configured to generate a third packet including data included in the first packet, and data included in the second packet, by the transmission timing, and a transmitter configured to send the third packet generated by the generator, to the relay at the transmission timing. The relay includes a second receiver configured to receive the third packet from the gateway, and a transferring unit configured to switch timing to transfer data, for each type of data, and transfer the third packet including the given data to another relay, during a period in which the gate is in the open state.

In the on-vehicle system as described above, the relay immediately transfers the packet received from the gateway. Accordingly, communication delay can be reduced. In this case, the transferring unit can transfer the third packet in the transmission timing while the gate is in the open state. Also, when processing according to the TAS standard is performed, the relay receives the give data while the gate associated with the given data is in the open state; therefore, the relay transfers the data without giving rise to transfer waiting time. Accordingly, communication delay can be reduced.

In the on-vehicle system as described above, a maximum payload size of packets in the first network may be smaller than the maximum payload size of packets in the second network. In this case, the gateway can collect a plurality of messages of CAN, etc. into one frame, and transfer the frame. Accordingly, the amount of communications between the gateway and the relay can be reduced.

In the on-vehicle system as described above, the on-vehicle device may sends the first packet and the second packet, in such timing that the first packet and the second packet reach the gateway immediately before the transmission timing. Thus, the on-vehicle device sends data to the gateway, at such a point in time that the data reaches the gateway at a point in time immediately before the gateway transfers the data. Accordingly, communication delay can be reduced.

In the on-vehicle system as described above, the transmission timing may include a first transmission timing for a first type of data. When the transmission timing synchronized by the first synchronizer is the first transmission timing, the generator may generate the third packet, by the first transmission timing, and when the transmission timing synchronized by the first synchronizer is the second transmission timing, the generator may generate the third packet including the second type of data included in the first packet and the second type of data included in the second packet, by the second transmission timing. Thus, the gateway sends a frame including messages received, to the relay, in timing corresponding to the type of the messages. Accordingly, communication delay can be reduced.

A gateway according to a second aspect of the disclosure is connected to a device via a first network, and connected to a relay via a second network. The gateway includes a synchronizer configured to synchronize timing in which the gateway sends given data to the relay, with transmission timing that is timing in which the gate is switched from a closed state to an open state; a receiver configured to receive a first packet and a second packet each including the given data, from the device, a generator configured to generate a third packet including data included in the first packet and data included in the second packet, by the transmission timing; and a transmitter configured to transmit the third packet generated by the generator, to the relay at the transmission timing.

A relay according to a third aspect of the disclosure is connected to a gateway via network and configured to perform open-close control of a gate, using a Time Aware Shaper standard of Ethernet Time-Sensitive Networking. The gateway is configured to synchronize timing in which the gateway sends given data to the relay, with transmission timing that is timing in which the gate is switched from a closed state to an open state. The relay includes a receiver configured to receive a packet including the given data from the gateway; and a transferring unit configured to switch timing to transfer data, for each type of data, and transfer the packet including the given data to another relay, during a period in which the gate is in the open state.

A non-transitory computer readable medium according to a fourth aspect of the disclosure stores a program. The program causes a gateway to execute a process. The gateway is connected to a device via a first network and connected to a relay via a second network and the relay is configured to perform open-close control of a gate, using a Time Aware Shaper standard of Ethernet Time-Sensitive Networking. The process includes, synchronizing timing in which the gateway sends given data to the relay, with transmission timing that is timing in which the gate is switched from a closed state to an open state; receiving a first packet and a second packet each including the given data, from the device; generating a third packet including data included in the first packet, and data included in the second packet, by the transmission timing; and transmitting the generated third packet to the relay at the transmission timing.

A non-transitory computer readable medium according to a fifth aspect of the disclosure stores a program. The program causes a relay to execute a process. The relay is connected to a gateway via a network and configured to perform open-close control of a gate, using a Time Aware Shaper standard of Ethernet Time-Sensitive Networking. The gateway is configured to synchronize timing in which the gateway sends given data to the relay, with transmission timing that is timing in which the gate is switched from a closed state to an open state. The process includes, receiving a packet including the given data from the gateway; and switching timing to transfer data, for each type of data, and transferring the packet including the given data to another relay, during a period in which the gate is in the open state.

An information processing method according to a sixth aspect of the disclosure is performed by a gateway that is connected to a device via a first network, and connected to a relay via a second network. The relay is configured to perform open-close control of a gate, using a Time Aware Shaper standard of Ethernet Time-Sensitive Networking. The method includes synchronizing timing in which the gateway sends given data to the relay, with transmission timing that is timing in which the gate is switched from a closed state to an open state; receiving a first packet and a second packet each including the given data, from the device; generating a third packet including data included in the first packet, and data included in the second packet, by the transmission timing; and transmitting the generated third packet to the relay at the transmission timing.

An information processing method according to a seventh aspect of the disclosure is performed by a relay connected to a gateway via a network. The relay is configured to perform open-close control of a gate, using a Time Aware Shaper standard of Ethernet Time-Sensitive Networking. The gateway is configured to synchronize timing in which the gateway sends given data to the relay, with transmission timing that is timing in which the gate is switched from a closed state to an open state. The method includes receiving a packet including the given data from the gateway; and switching timing to transfer data, for each type of data, and transferring the packet including the given data to another relay, during a period in which the gate is in the open state.

An information processing system according to an eighth aspect of the disclosure includes a device; a gateway connected to the device via a first network; and a relay connected to the gateway via a second network, the relay being configured to perform open-close control of a gate, using a Time Aware Shaper standard of Ethernet Time-Sensitive Networking. The gateway includes a first synchronizer configured to synchronize timing in which the gateway sends given data to the relay, with transmission timing that is timing in which the gate is switched from a closed state to an open state, a first receiver configured to receive a first packet and a second packet each including the given data, from the device, a generator configured to generate a third packet including data included in the first packet, and data included in the second packet, by the transmission timing, and a transmitter configured to send the third packet generated by the generator, to the relay at the transmission timing. The relay includes a second receiver configured to receive the third packet from the gateway, and a transferring unit configured to switch timing to transfer data, for each type of data, and transfer the third packet including the given data to another relay, during a period in which the gate is in the open state.

A vehicle according to a ninth aspect of the disclosure is the on-vehicle system according to the above aspects.

According to the above aspects of the disclosure, communication delay can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of the disclosure will be described based on the drawings.

System Configuration

Figure 1:
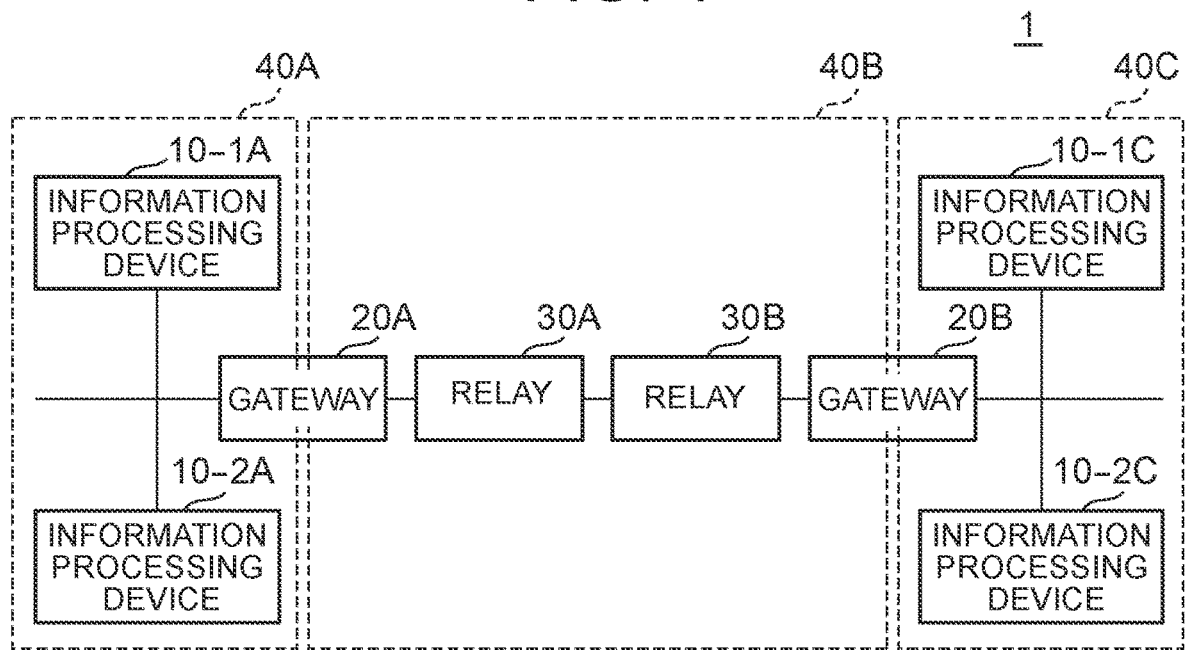
FIG. 1 is a view showing an example of the configuration of a communication system according to one embodiment.

FIG. 1 shows an example of the configuration of an information processing system 1 according to the embodiment. In FIG. 1, the information processing system 1 has a network 40A, network 40B, network 40C, . . . (which will be simply called "network 40" when they need not be distinguished from one another). The number of the networks 40 is not limited to that of the example of FIG. 1.

The information processing system 1 has information processing device 10-1A and information processing device 10-2A which are connected to the network 40A, and information processing device 10-1C and information processing device 10-2C which are connected to the network 40C. The information processing devices 10-1A, 10-2A, 10-1C, 10-2C will be simply called "information processing device 10" when they need not be distinguished from one another.

The number of the information processing devices 10 is not limited to that of the example of FIG. 1.

For example, CAN with Flexible Date-Rate (CANFD), CAN, FlexRay, Local Interconnect Network (LIN), or the like, is used as the network 40A and the network 40C. Also, Ethernet, or the like, is used as the network 40B.

The information processing system 1 also has a gateway 20A and a gateway 20B (which will be simply called "gateway 20" when they need not be distinguished from each other). The number of the gateways 20 is not limited to that of the example of FIG. 1.

The gateway 20A is a communication device that relays communications between the network 40A and the network 40B. Also, the gateway 20B is a communication device that relays communications between the network 40B and the network 40C.

The information processing system 1 also has a relay 30A and a relay 30B (which will be simply called "relay 30" when they need not be distinguished from each other). The relay 30 is a switch, or the like, which relays communications in the network 40B. The number of the relays 30 is not limited to that of the example of FIG. 1.

An example in which the information processing system 1 is installed on a vehicle (not shown) will be described. More specifically, an on-vehicle system will be illustrated as an example in which on-vehicle devices (on-vehicle electronic control units (ECUs)) as one example of the information processing devices 10 are connected to an on-vehicle LAN (on-vehicle network, as one example of the "network"), and are also connected via on-vehicle gateways as one example of the gateways 20, and on-vehicle relays as one example of the relays 30.

However, the technology of this disclosure can also be applied to various devices, various relays, etc. in various network systems, like the information processing system 1, including network systems for device control within apparatuses, such as robots, aircrafts, satellites, game machines, etc., network systems for device control in factories, etc., and Internet of Things (IoT) systems connecting sensors, etc. to clouds, etc.

Hardware Configuration

Figure 2:
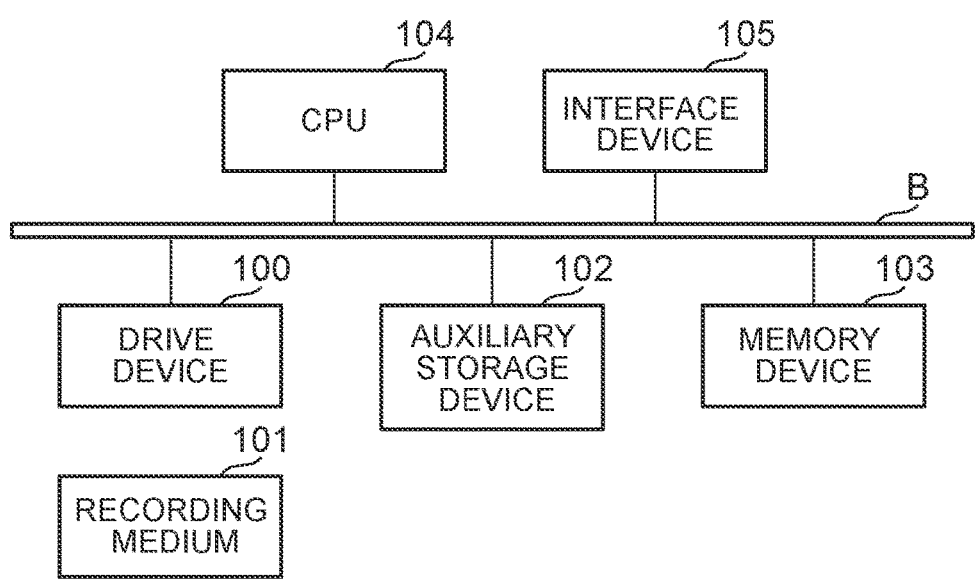
FIG. 2 is a view showing an example of the hardware configuration of an information processing device, gateway, and relay according to the embodiment.

FIG. 2 shows an example of the hardware configuration of the information processing device 10, gateway 20, and relay 30 according to the embodiment. Here, the gateway 20 will be illustrated as an example. The gateway 20 of FIG. 2 has a drive device 100, auxiliary storage device 102, memory device 103, central processing unit (CPU) 104, interface device 105, and so forth, which are connected to each other via a bus B.

An information processing program that implements processing in the gateway 20 is provided by a recording medium 101, for example. Once the recording medium 101 in which the information processing program is recorded is set in the drive device 100, the information processing program read from the recording medium 101 is installed on the auxiliary storage device 102 via the drive device 100. However, the information processing program is not necessarily installed by use of the recording medium 101, but may be downloaded from another computer, via a network. The auxiliary storage device 102 stores the information processing program thus installed, and also stores necessary files, data, etc.

The memory device 103, which is, for example, a random access memory (RAM), reads a program from the auxiliary storage device 102 and stores it, when a command to start the program is generated. The CPU 104 implements a function associated with the gateway 20, according to the program stored in the memory device 103. The interface device 105 is used as an interface for connecting the gateway 20 with a network. The interface device 105 is provided for each of two or more network ports provided in the gateway 20, for example.

As one example of the recording medium 101, a portable recording medium, such as CD-ROM, DVD, or USB memory, may be used. As one example of the auxiliary storage device 102, a hard disc drive (HDD), or a flash memory may be used. Both of the recording medium 101 and the auxiliary storage device 102 correspond to computer-readable recording mediums.

The hardware configurations of the information processing device 10 and the relay 30 may be similar to that of the gateway 20. The information processing device 10 may include only one interface device 105.

Functional Configuration

Figure 3:
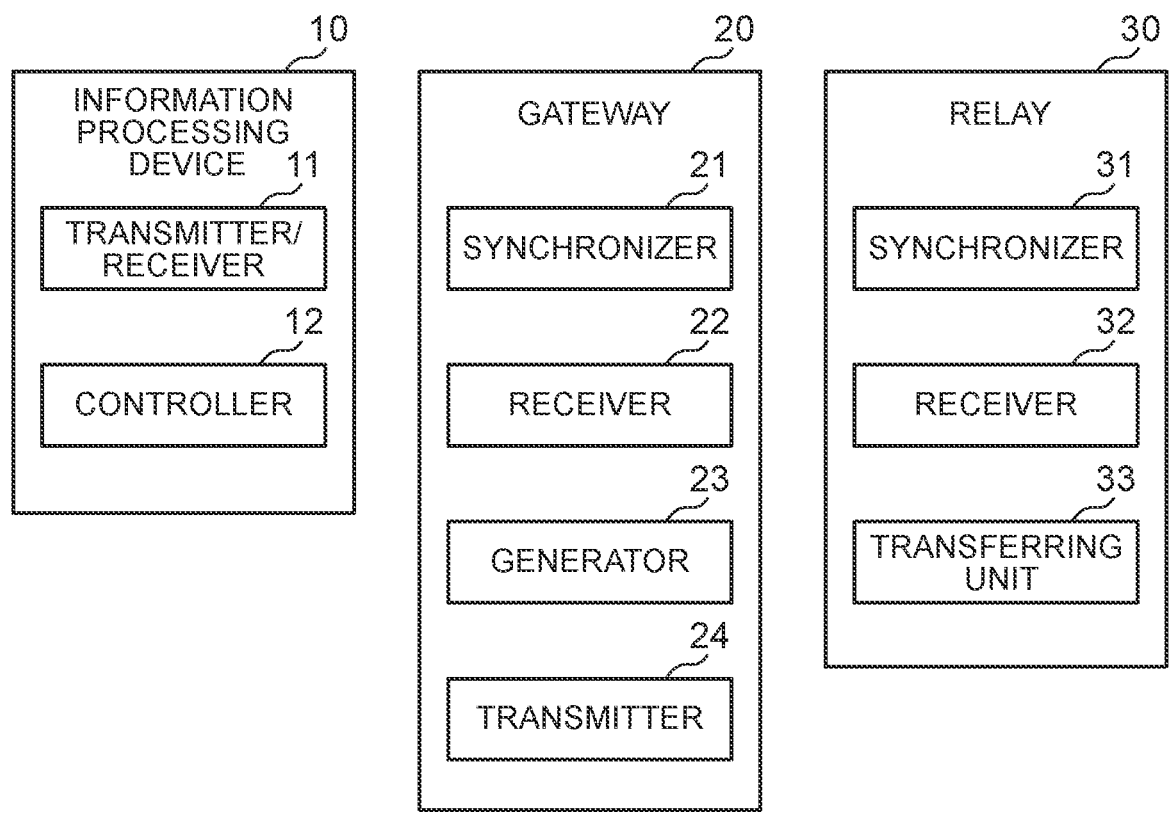
FIG. 3 is a functional block diagram showing an example of the functional configuration of the information processing device, gateway, and relay according to the embodiment.

Referring next to FIG. 3, the functional configurations of the information processing device 10, gateway 20, and relay 30 will be described. FIG. 3 is a functional block diagram of the information processing device 10, gateway 20, and relay 30 according to the embodiment.

The information processing device 10 has a transmitter/receiver 11, and a controller 12. The transmitter/receiver 11 and the controller 12 represent functions implemented through processing executed by the CPU of the information processing device 10, according to one or more programs installed on the information processing device 10.

The transmitter/receiver 11 conducts communications with other information processing devices 10, gateways 20, and relays 30, according to a command of the controller 12.

The controller 12 controls various equipments, such as sensors and components included in the information processing device 10, and causes the transmitter/receiver 11 to send data of the various equipments to other information processing devices 10.

The gateway 20, has a synchronizer 21, receiver 22, generator 23, and transmitter 24. The synchronizer 21, receiver 22, generator 23, and transmitter 24 represent functions implemented through processing executed by the CPU 104 of the gateway 20, according to one or more programs installed on the gateway 20.

The synchronizer 21 synchronizes timing in which each relay 30 sends a given type of data to relay 30, with transmission timing that is timing in which the gate is switched from a closed state to an open state (described later).

The receiver 22 receives two or more frames (one example of the "first packet" and "second packet") including the given type of data, from the information processing devices 10 connected to the network 40A (one example of the "first network"). Also, the receiver 22 receives frames from the relays 30 connected to the network 40B (one example of the "second network").

The generator 23 generates one frame (one example of the "third packet") to be transferred to the network 40B, which frame includes data of payload portions of two or more frames received from the network 40A by the receiver 22, by transmission timing. Also, the generator 23 retrieves each data included in one frame received from the network 40B by the receiver 22, and generates a frame to be transferred to the network 40C, which frame includes the retrieved each data.

The transmitter 24 sends the frame generated by the generator 23 so as to be transferred to the network 40B, to the relay 30 at the transmission timing, via the network 40B.

Also, the transmitter 24 sends each frame generated by the generator 23 so as to be transferred to the network 40C, to the network 40C The relay 30 has a synchronizer 31, receiver 32, and transferring unit 33. The synchronizer 31, receiver 32, and transferring unit 33 represent functions implemented through processing executed by the CPU of the relay 30, according to one or more programs installed on the relay 30.

The synchronizer 31 synchronizes the transmission timing in which the gateways 20 and other relays 30 send given type of data, with the gateways 20 and other relays 30.

The receiver 32 receives a frame from the gateway 20 via the network 40B.

The transferring unit 33 switches the timing to transfer data, for each class (one example of "type") of data, and transfers the frame received by the receiver 32, in the transmission timing synchronized by the synchronizer 31.

The transferring unit 33 performs gate control using the IEEE 802.1Qbv TAS standard included in the Ethernet TSN standards, for example. More specifically, under the gate control, the transferring unit 33 of the relay 30A places the received frame in a queue for each class, such as priority, and waits for transfer of the frame when a gate (TAS gate) for the class of the frame is in a closed state (Close). Then, the transferring unit 33 transfers the frame, during a period in which the gate for the class of the frame is in an open state (Open). The gate for each class may be placed in the open state for a given period of time, in given cycles.

Here, the transmission timing synchronized by the synchronizer 31 is any given point in time included in the period during which the TAS gate for the given type of data is in the open state. The transmission timing may be timing in which the gate is switched from a closed state to an open state.

Figure 4:
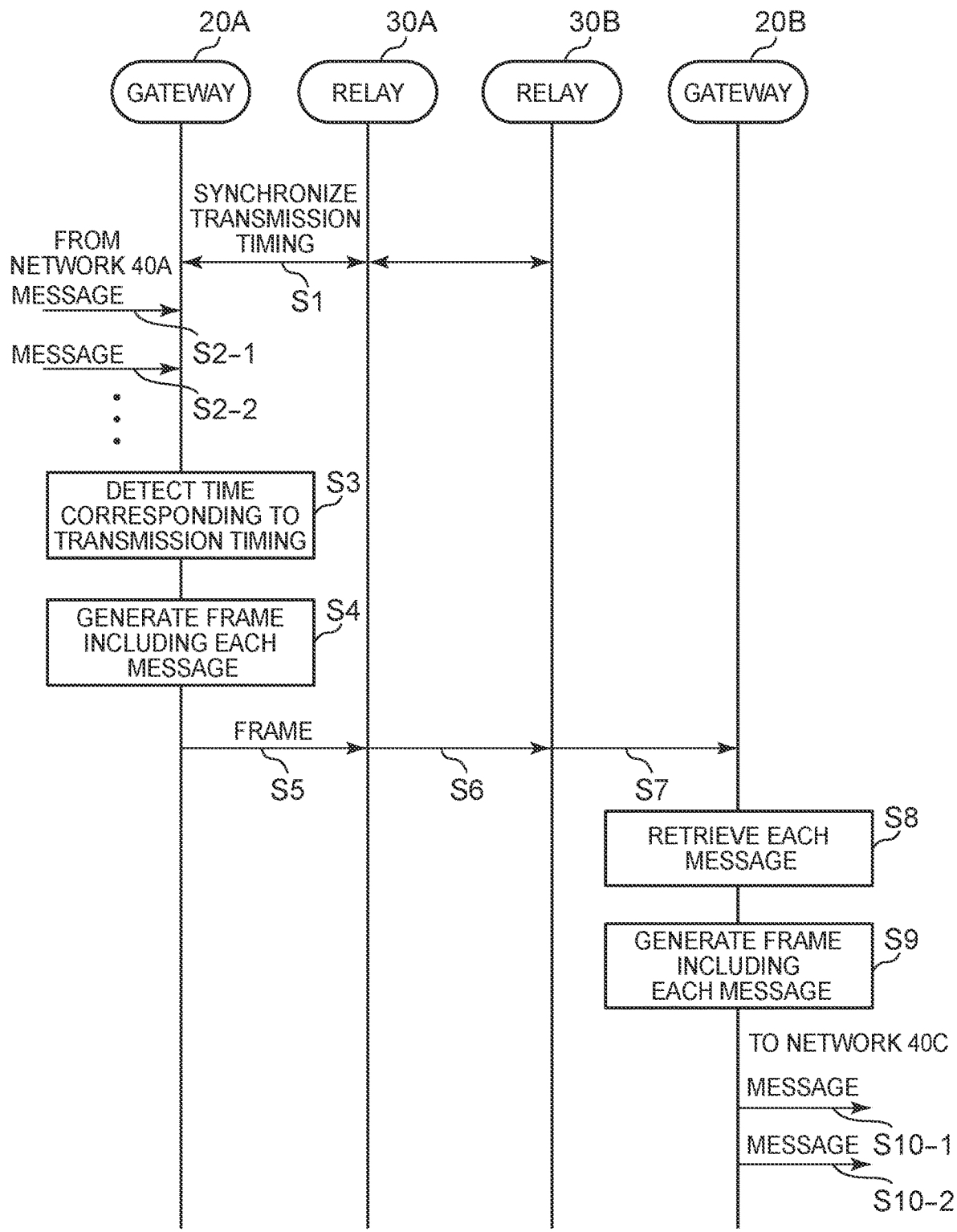
FIG. 4 is a sequence diagram showing one example of processing of the communication system according to the embodiment.
Figure 5:
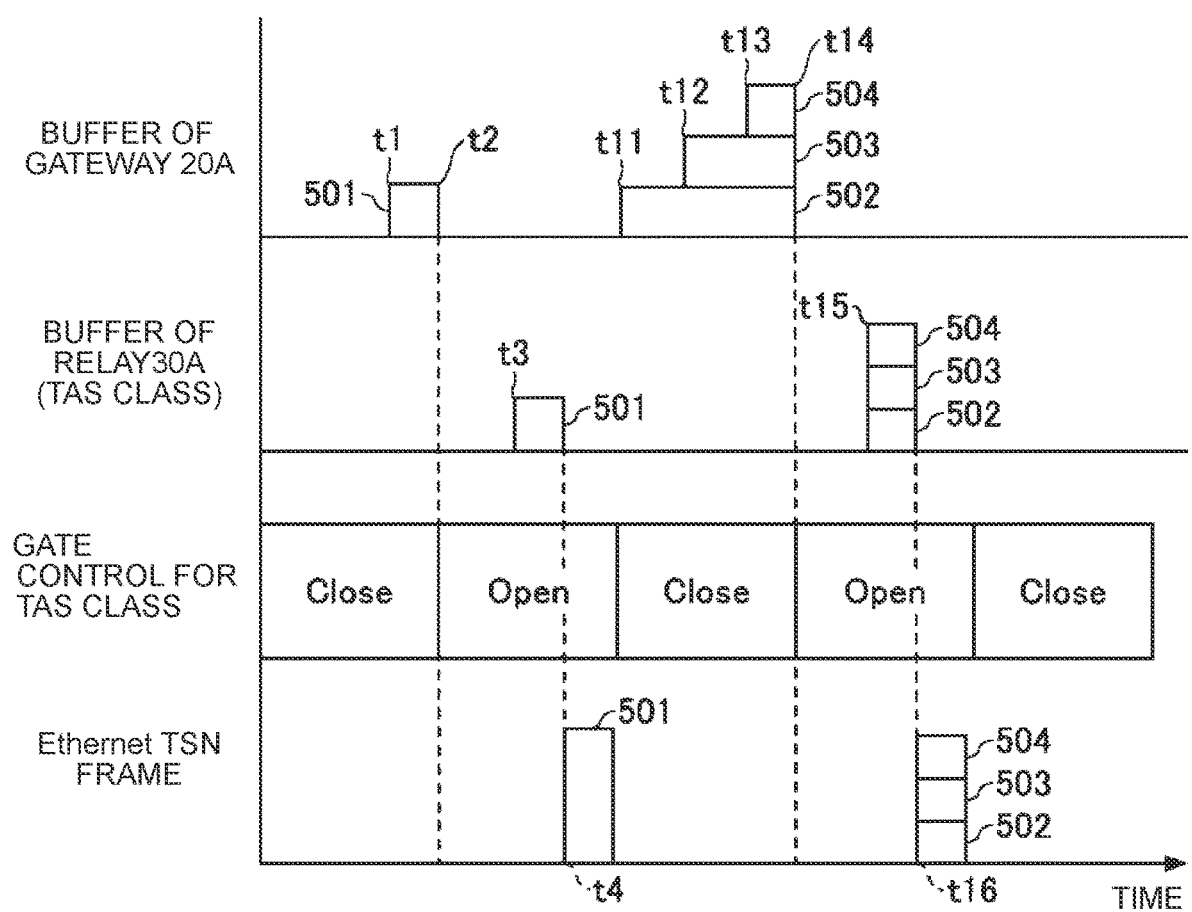
FIG. 5 is a view useful for explaining the timing of transfer of each message.

Referring next to FIG. 4 and FIG. 5, processing of the information processing system 1 according to the embodiment will be described. FIG. 4 is a sequence diagram showing one example of processing of the information processing system 1 according to the embodiment.

In the case as described below, the gateway 20A transfers various data received from the network 40A, such as CAN, to the network 40C, such as CAN, via the network 40B, such as Ethernet, and gateway 20B. For example, the various data may include data related to the safety of the vehicle and thus having relatively high priority, such as values obtained from sensors, and commands for controlling actuators.

Initially, in step S1, the synchronizer 21 of the gateway 20A, synchronizer 31 of the relay 30A, and synchronizer 31 of the relay 30B synchronize the same transmission timing with respect to data transferred by the gateway 20A.

In this connection, the synchronizer 21 of the gateway 20A and the synchronizer 31 of each relay 30 may perform clock time synchronization, using IEEE 802.1:802.1 AS— Timing and Synchronization, or Precision Time Protocol (PTP), for example.

Then, for example, the synchronizer 31 of one relay 30A informs the gateway 20A and other relay 30B, of one transmission time and transmission cycle, with respect to data transferred by the gateway 20A. Then, the synchronizer 21 of the gateway 20A and the synchronizer 31 of the other relay 30B determine clock times at the end of each transmission cycle as counted from the above one transmission time, as the transmission timing.

In another example, the synchronizer 21 of the gateway 20A may inform each relay 30 of one transmission time at which the gateway 20A transfers data, and transmission cycle. Then, the synchronizer 31 of each relay 30 may determine clock times at the end of each transmission cycle as counted from the above one transmission time, as the transmission timing for data received from the gateway 20A.

Then, the receiver 22 of the gateway 20A receives one or more frames including various data (messages), from the information processing device 10-1A, etc., via the network 40A (step S2-1, step S2-2). Here, the receiver 22 of the gateway 20A receives CAN frames each having a payload equal to or smaller than 8 bytes.

The controller 12 of the information processing device 10 connected to the network 40A may transmit a message to the network 40A, in such timing that the message reaches the gateway 20A immediately before the transmission timing. In this case, the controller 12 of the information processing device 10 performs clock time synchronization with the gateway 20A, etc. in step S1, for example. Also, the controller 12 of the information processing device 10 calculates in advance or measures a transmission delay time in the network 40A from the information processing device 10 to the gateway 20A. The transmission delay time may be calculated or measured by a known method. Then, the controller 12 of the information processing device 10 sends the message, at a point in time earlier than the transmission timing by the transmission delay time, and a given offset time. In this manner, it is possible to shorten a delay time from the time when the gateway 20A receives the message, to the time when the gateway 20A transfers the message.

Then, the generator 23 of the gateway 20A determines that a given point in time corresponding to the transmission timing synchronized by the synchronizer 21 has come (step S3). Here, the given point in time may be the transmission timing, or may be a point in time earlier by a given length of time than the transmission timing. In this case, the given length of time may be a preset time, or may be an average time of transmission delay from the gateway 20A to the relay 30A, which is measured by the generator 23.

Then, the generator 23 of the gateway 20A generates one frame including each message included in the payload of one or more frames received via the network 40A (step S4). Here, each time the above-mentioned given point in time comes, the generator 23 of the gateway 20A collects (packs) each payload of one or more frames received using the network 40A, such as CAN, into one frame to be transmitted using the network 40B, such as Ethernet. This is because the maximum payload size (e.g., the maximum payload size of CAN is 8 bytes) of frames that can be transmitted and received via the network 40A is smaller than the maximum payload size (e.g., the maximum payload size of Ethernet is 1500 bytes) of frames that can be transmitted and received via the network 40B.

Then, the transmitter 24 of the gateway 20A sends the above one frame generated by the generator 23, to the relay 30A via the network 40B (step S5).

Then, the transferring unit 33 of the relay 30A transfers the one frame received by the receiver 32, to the relay 30B (step S6). Here, since the relay 30 receives a given frame from the gateway 20 while the gate for the class of the given frame is in the open state, the given frame is immediately transferred. Accordingly, there arises no waiting time, for the given frame, until the gate is placed in the open state.

While the relay 30 is transferring one frame having low priority, it may receive another frame having high priority, for example. In this case, according to IEEE 802.1Qbv, the relay 30 can transfer the other fame at a given point in time, without waiting for completion of transfer of the one frame. It is thus possible to prevent delay in transfer of the other frame from exceeding a permissible range.

Then, the transferring unit 33 of the relay 30B transfers the received frame to the gateway 20B (step S7). Here, the transferring unit 33 of the relay 30B also performs the gate control as described above.

Then, the generator 23 of the gateway 20B retrieves each message, from the payload of the received frame (step S8), and generates frames of CAN, or the like, each of which includes each message (step S9).

Then, the transmitter 24 of the gateway 20B sends the frames generated by the generator 23, to the network 40C (step S10-1, step S10-2, . . . ). Here, the generator 23 of the gateway 20B may retrieve each message in order of priority set in advance according to a message ID, or the like, included in each message, and cause the transmitter 24 to send a frame including the retrieved message. Thus, delay in transmission of the message having relatively high priority can be further reduced.

Referring next to FIG. 5, the timing in which each message received in the network 40A is transferred to the network 40C via the network 40B will be described. FIG. 5 is useful for explaining the timing of transfer of each message.

In the example of FIG. 5, at time t1, the receiver 22 of the gateway 20A receives a message 501 via the network 40A, and stores it in a buffer. Then, at time t2 as a transmission time, the transmitter 24 of the gateway 20A sends an Ethernet TSN frame including the message 501 stored in the buffer, to the relay 30A, and deletes the message 501 from the buffer.

Then, at time t3, the receiver 32 of the relay 30A receives the Ethernet TSN frame including the message 501, from the gateway 20A. Then, the transferring unit 33 of the relay 30A immediately starts a transferring process, since the TAS gate for the frame is in the open state, and transfers the frame to the relay 30B, at time t4.

Similarly, in the example of FIG. 5, at time t11, time t12, and time t13, the receiver 22 of the gateway 20A receives a message 502, a message 503, and a message 504, respectively, via the network 40A, and stores them in the buffer. Then, at time t14 as a transmission time, the transmitter 24 of the gateway 20A sends one Ethernet TSN frame including the message 502, message 503, and message 504 stored in the buffer, to the relay 30A, and deletes the message 502, message 503, and message 504 from the buffer.

Then, at time t15, the receiver 32 of the relay 30A receives one Ethernet TSN frame including the message 502, message 503, and message 504 from the gateway 20A. Then, the transferring unit 33 of the relay 30A immediately starts a transferring process since the TAS gate for the frame is in the open state, and transfers the frame to the relay 30B, at time t16.

Thus, there arises no waiting period for which transfer is waited until the TAS gate is placed in the open state; therefore, the delay can be reduced.

FIRST MODIFIED EXAMPLE

In step S1 as described above, the synchronizer 21 of the gateway 20A, synchronizer 31 of the relay 30A, and synchronizer 31 of the relay 30B may synchronize the same transmission timing, or synchronize the transmission timing, for each type of messages sent and received in the network 40A.

In this case, in the above step S3, the generator 23 of the gateway 20A determines that a given point in time corresponding to the transmission timing ("first transmission timing") of one type (one example of "first type") synchronized by the synchronizer 21 has come.

Then, in the above step S4, the generator 23 of the gateway 20A retrieves one or more frames (one example of "first packet" and "second packet") included in the above-indicated one type, out of the frames received from the network 40A, based on the message ID included in each of the received frames. Then, the generator 23 of the gateway 20A generates one frame including each payload of the one or more frames.

Then, in the above step S5, the transmitter 24 of the gateway 20A sends the one frame generated by the generator 23, to the relay 30A.

Similarly, when the generator 23 of the gateway 20A determines that a given point in time corresponding to the transmission timing ("second transmission timing") of another type (one example of "second type") has come, the generator 23 generates one frame including each payload of one or more frames included in the other type, and causes the transmitter 24 to send the frame. In this case, the generator 23 of the gateway 20A may attach a tag of Virtual Local Area Network (VLAN), or the like, indicating each type, to the one frame.

SECOND MODIFIED EXAMPLE

As the network 40B, Time-Triggered Ethernet (TT-Ethernet) that synchronizes the time of day among nodes within the Ethernet network, and sets the transmission timing of Ethernet frames in advance may be used, in place of the Ethernet TSN.

While one embodiment of the disclosure has been described in detail, this disclosure is not limited to the particular embodiment, but may be embodied with various modifications or changes, within the scope of the disclosure as defined in the appended claims.

The synchronizer 21, receiver 22, synchronizer 31, and receiver 32 are respective examples of the "first synchronizer", "first receiver", "second synchronizer", and "second receiver".

What is claimed is:

1. An on-vehicle system comprising:
    an on-vehicle device;
    a gateway connected to the on-vehicle device via a first network; and
    a relay connected to the gateway via a second network, the relay being configured to perform open-close control of a gate, using a Time Aware Shaper standard of Ethernet Time-Sensitive Networking, wherein:
    the gateway includes
        a first synchronizer configured to synchronize timing in which the gateway sends given data to the relay, with transmission timing that is timing in which the gate is switched from a closed state to an open state,
        a first receiver configured to receive a first packet and a second packet each including the given data, from the on-vehicle device,
        a generator configured to generate a third packet including data included in the first packet, and data included in the second packet, by the transmission timing, and
        a transmitter configured to send the third packet generated by the generator, to the relay at the transmission timing, and
    the relay includes
        a second receiver configured to receive the third packet from the gateway, and a transferring unit configured to switch timing to transfer data, for each type of data, and transfer the third packet including the given data to another relay, during a period in which the gate is in the open state.

2. The on-vehicle system according to claim 1, wherein a maximum payload size of packets in the first network is smaller than the maximum payload size of packets in the second network.

3. The on-vehicle system according to claim 1, wherein the on-vehicle device sends the first packet and the second packet, in such timing that the first packet and the second packet reach the gateway immediately before the transmission timing.

4. The on-vehicle system according to claim 1, wherein the transmission timing includes a first transmission timing for a first type of data, and a second transmission timing for a second type of data,
when the transmission timing synchronized by the first synchronizer is the first transmission timing, the generator generates the third packet, by the first transmission timing, and
when the transmission timing synchronized by the first synchronizer is the second transmission timing, the generator generates the third packet including the second type of data included in the first packet and the second type of data included in the second packet, by the second transmission timing.

5. A gateway connected to a device via a first network and connected to a relay via a second network, and the relay being configured to perform open-close control of a gate, using a Time Aware Shaper standard of Ethernet Time-Sensitive Networking, the gateway comprising:
a synchronizer configured to synchronize timing in which the gateway sends given data to the relay, with transmission timing that is timing in which the gate is switched from a closed state to an open state;
a receiver configured to receive a first packet and a second packet each including the given data, from the device;
a generator configured to generate a third packet including data included in the first packet and data included in the second packet, by the transmission timing; and
a transmitter configured to transmit the third packet generated by the generator, to the relay at the transmission timing.

6. A non-transitory computer readable medium storing a program causing a gateway to execute a process, the gateway being connected to a device via a first network and connected to a relay via a second network, and the relay being configured to perform open-close control of a gate, using a Time Aware Shaper standard of Ethernet Time-Sensitive Networking,
the process comprising:
synchronizing timing in which the gateway sends given data to the relay, with transmission timing that is timing in which the gate is switched from a closed state to an open state;
receiving a first packet and a second packet each including the given data, from the device;
generating a third packet including data included in the first packet, and data included in the second packet, by the transmission timing; and
transmitting the generated third packet to the relay at the transmission timing.

7. An information processing method performed by a gateway connected to a device via a first network and connected to a relay via a second network, and the relay being configured to perform open-close control of a gate, using a Time Aware Shaper standard of Ethernet Time-Sensitive Networking, the information processing method comprising:
synchronizing timing in which the gateway sends given data to the relay, with transmission timing that is timing in which the gate is switched from a closed state to an open state;
receiving a first packet and a second packet each including the given data, from the device;
generating a third packet including data included in the first packet, and data included in the second packet, by the transmission timing; and
transmitting the generated third packet to the relay at the transmission timing.

8. An information processing system comprising:
a device;
a gateway connected to the device via a first network; and
a relay connected to the gateway via a second network, the relay being configured to perform open-close control of a gate, using a Time Aware Shaper standard of Ethernet Time-Sensitive Networking, wherein:
the gateway includes
a first synchronizer configured to synchronize timing in which the gateway sends given data to the relay, with transmission timing that is timing in which the gate is switched from a closed state to an open state,
a first receiver configured to receive a first packet and a second packet each including the given data, from the device,
a generator configured to generate a third packet including data included in the first packet, and data included in the second packet, by the transmission timing, and
a transmitter configured to send the third packet generated by the generator, to the relay at the transmission timing; and
the relay includes
a second receiver configured to receive the third packet from the gateway, and
a transferring unit configured to switch timing to transfer data, for each type of data, and transfer the third packet including the given data to another relay, during a period in which the gate is in the open state.

9. A vehicle comprising the on-vehicle system according to claim 1.

* * * * *